July 27, 1943.                J. R. CRAIG                2,325,113
                        METHOD FOR TREATING WELDS
                           Filed Jan. 23, 1940
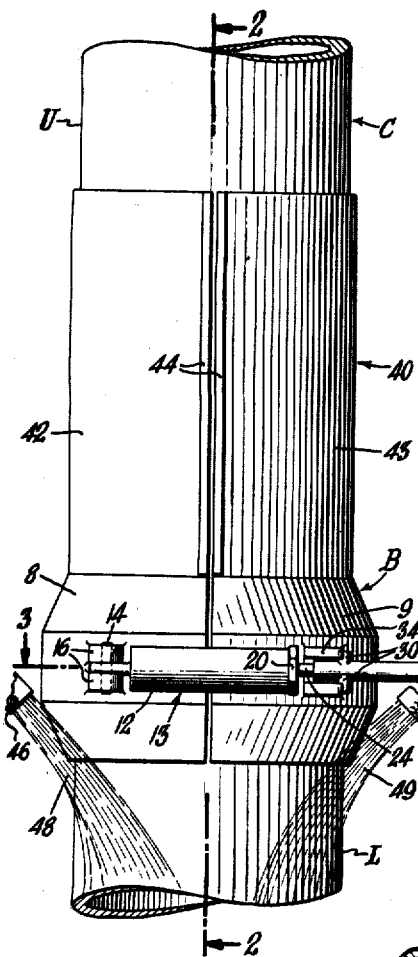
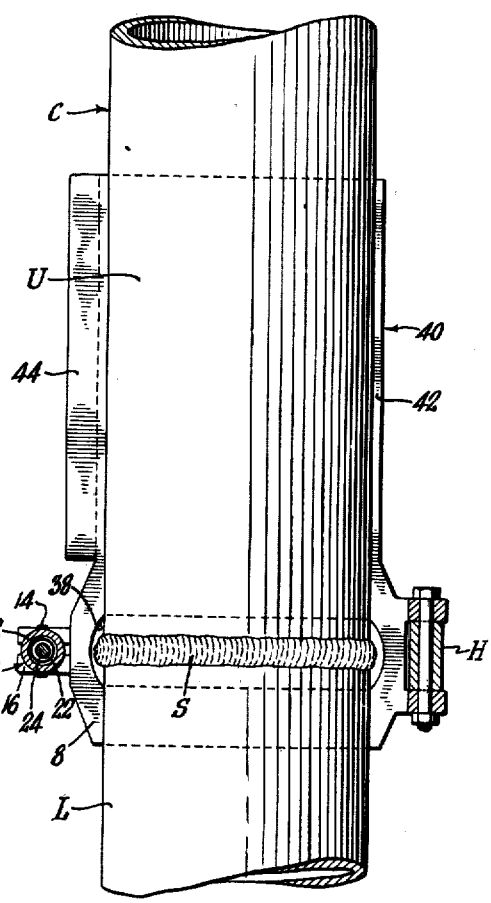
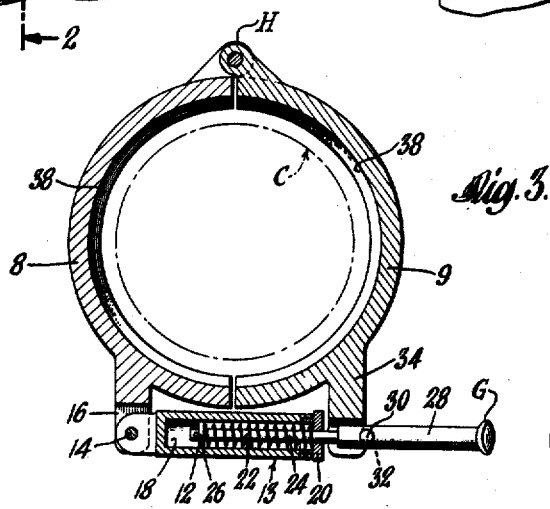
INVENTOR
JAMES R. CRAIG
BY
ATTORNEY Patented July 27, 1943

2,325,113

UNITED STATES PATENT OFFICE 2,325,113

METHOD FOR TREATING WELDS

James R. Craig, Kenmore, N. Y., assignor to The Linde Air Products Company, a corporation of Ohio Application January 23, 1940, Serial No. 315,195

7 Claims. (Cl. 148—21)

This invention relates to the fabrication of oil well casing and similar structures comprising a series of metal pipes or similar sections welded end to end. More particularly, the invention relates to a method for treating welded joints or other welds, especially those in iron and steel. A principal purpose of the invention is to produce in such welded joints, in a minimum time, an improved metallographic structure. The invention is advantageously applied to welds immediately after the welding operation and before the temperature of the weld metal has fallen below the critical range. In such cases the time required for the cooling step is decreased and the overall time for the complete welding cycle is shortened. In case it is impossible to carry out the treatment before the temperature of the weld metal has fallen below the critical range, the weld may be reheated to a temperature at least above the lower critical point.

In the welding of oil well casings, the first section of pipe or casing is lowered into the drill or well hole, and held in vertical position. The next section is then clamped in end-to-end relation with the first section, and the two sections are tack welded to prevent misalignment or distortion due to the welding heat or other causes. The adjoining sections are then butt welded, as by fusion depositing filler material along and between the opposed ends while so secured together, thus insuring good penetration of the weld filler material. Prior to the present invention, the sections were maintained in their position until the weld or seam had cooled enough to have a tensile strength sufficient to support the casing below it, which up to then had been held by a clamp. This clamp was then released and the fabricated casing was lowered and these steps were repeated until the casing had reached the desired length.

When the weld seam in an oil well casing is allowed to cool by dissipation of heat to the surrounding atmosphere and to remote portions of the casing, the cooling period may be as high as 15 to 20 minutes. Since it is necessary to wait until the weld seam has cooled before subjecting it to any substantial tensile stress, attempts have been made to cool the weld seams by employing various rapidly moving liquid cooling media, such as water or oil, applied directly against both the seam and to the portion of the sections immediately adjacent thereto. However, such cooling, if too rapid, may cause brittleness at the weld seam. Furthermore, there is a probability of intense internal stresses which are undesirable characteristics in any welded assembly, and especially so in oil well casings, where the assembly is subjected to repeated shocks during the installation and where any failure leads to an expensive "fishing" operation.

These internal stresses are due among other causes, to the fact that when the end of a weld joins the beginning of a weld there are produced so-called "hot spots" or portions of higher than ordinary temperature. Such hot spots are produced by the circumferential welding of any cylindrical pipe unless the diameter of the pipe is so great that the portion of the pipe where the weld was started has had time to cool before the completion of the weld reaches this beginning. Such is not the case in the welding of oil well casings of the sizes commonly used. In fact, for the sake of speed it is customary to have two welders start at diametrically opposite points, and thus two hot spots are produced. If substantial differences in temperature about the periphery of the weld are not eliminated before any portion of the metal in the weld zone cools below the critical range, severe internal stresses will be set up.

In fabricating oil well casing by welding it is desirable to reduce the time required for the cooling steps of the entire welding cycle. The temperature of the weld at the finish of the cooling operation must be low enough that the weld will have sufficient strength to support the "string" or assembled casing depending from it. The time of the entire welding operation, including the cooling step, must not be greatly in excess of that required for the making of screw-threaded connections. The metallographic structure of the weld should be satisfactory.

The selection of a suitable quenching medium to prevent internal stresses and to secure good metallographic structure, and the correct employment of this medium therefore are of importance. Suitable media are fluids such as water or air when used under particular conditions and in connection with a novel apparatus which is to be described herein and which forms part of the present invention.

One of the principal objects of this invention is to provide a simple and economical process whereby the weld, seam or joint, joining fabricated parts, may be cooled quickly while avoiding brittleness therein. Another object is to provide a process of cooling rapidly and at the same time preserving resistance to shocks in the seams. Still another object of this invention is to provide a method of decreasing the brittleness of welded seams which have been allowed to cool at a rate which fails to give the best metallographic structure. A further object is to eliminate substantial differences in temperature in deposited weld metal and in the metal adjacent the weld. Yet another object of this invention is the production of a metal construction or assembly such as a pipe or casing having a weld seam which is lacking in brittleness and is unusually tough and strong.

Other objects of the invention will in part be set forth hereafter and will in part be evident.

from the following description taken in connection with the accompanying drawing in which:

Fig. 1 is a view in front elevation of apparatus suitable for use in the practice of the invention in use on an oil well casing, the drawing showing the casing cooled to a temperature at which the apparatus would normally be removed;

Fig. 2 is a vertical sectional view of the apparatus taken on the plane of line 2—2 of Fig. 1; and Fig. 3 is a horizontal sectional view taken on the plane of line 3—3 of Fig. 1.

Certain of the objects above-defined are achieved by the provision of a method of progressively fabricating an oil well casing as it is lowered into a well. According to the invention, a metal casing section is supported in position to be lowered into the well, and another section is aligned in end-to-end relation with the first section. The sections are then welded together, for example by oxyacetylene methods. While the metal of the welded joint is still at a temperature above its critical range, the joint and adjacent areas are covered, preferably by a device later to be described, and a cooling fluid such as water or air is directed at the lower casing section at a point below, but close to, the weld until the metal at the joint is cooled below its critical range. The joint is then uncovered and the united sections lowered into the well for a distance about equal to the length of a single section. The process is then repeated, adding new sections, until the desired length of casing is produced.

In connection with the described method, apparatus of the type illustrated in the accompanying drawing may be used. In the drawing there is shown by way of example a cooling device applied to an oil well casing C. This casing consists of an upper casing section U and a lower casing section L, the two sections being connected together by a circumferential weld joint or seam S. The cooling device or block B comprises a pair of semi-cylindrical members 8 and 9, preferably consisting of metal having a high thermal conductivity, such, for example, as copper. The semi-cylindrical members 8 and 9 are connected together as by a hinge H for opening and closing movement over the casing C. At the side of the device opposite the hinge H, there is provided spring clamp means 13, preferably comprising an arm 12 pivoted at 14 to a lug 16 on one of the semi-cylindrical members. For convenience the spring clamp means 13 has been shown on the semi-cylindrical member 8. The arm 12 is provided with a bore 18 enclosed by an apertured cap 20 which is secured to the arm 12 by a suitable means such as screw threads. Within the bore and extending through the aperture in the cap is a rod 24 carrying a thrust washer 26 at the end remote from the cap. A coiled compression spring 22 surrounds the rod 24 engaging the thrust washer 26 and the cap 20 to urge the rod 24 in a left hand direction, as seen in the drawing. Any other means for holding the rod 24 may be employed, bearing in mind the necessity of giving a certain amount of play to the rod and hence to the two semi-cylindrical members to compensate for shrinkage during cooling of the work.

Secured to the end of the rod 24 is a handle 28 having a pair of lugs 30 thereon for a purpose to be disclosed hereafter. The handle is also provided with a grip G so that it may be grasped and pulled against the force of the spring 22. On the semi-cylindrical member which does not support spring clamp means 13, in the present case member 9, there is provided a pair of lugs or other projections 34. These lugs are furnished with concavities or notches 32 with which the lugs 30 interfit to clamp the device in place on the casing. With this arrangement, the grip G of the handle 28 may be pulled against the force of the spring 22 to latch and release the spring clamp 13 with one hand while the other hand is used properly to position the device B on the casing C relative to the weld seam S. It will be noted that upon application of the device B to the heated casing the spring 22 is under considerable compression; as the weld cools and the members 8 and 9 approach each other the spring 22 expands but not to such an extent that the rod 24 engages with the inner end of the bore 18.

In order that the members 8 and 9 may be spaced from the weld seam S, the semi-cylindrical members 8 and 9 are provided with grooves 38. These grooves are aligned and form a practically continuous annular groove when the device B is assembled about a casing. Thus, the clamp 13 acts to maintain the members 8 and 9 in physical contact with the pipe or casing C as the latter contracts in cooling with the device B covering substantially all of, but being out of contact with, the weld seam S.

At the top of each of the semi-cylindrical members 8 and 9 there is provided an upwardly extending skirt 40 comprising semi-cylindrical parts 42 and 43, welded or otherwise secured to the upper edge of the members 8 and 9 respectively. It has been found that brass is a particularly suitable material for these skirt members, although the invention is in no way limited to such a material. The skirt members 42 and 43 have front edge flanges 44 to prevent water from entering the crack between them. The skirt formed by these members prevents any of the cooling medium, such as water, when applied in a manner hereinafter set forth, from splashing up over the semi-cylindrical members 8 and 9 and running down the surface of the upper section U of the casing into the weld seam S.

It has been found that when using the device B, water can be employed as a cooling medium. The water or other cooling medium is directed by hose or pipes 46 and 47 in streams 48 and 49. The streams 48 and 49 should impinge on the lower casing L immediately below the semi-cylindrical members 8 and 9. Heat is conducted from the weld or seam S, through the lower casing L, to the point where the streams 48 and 49 impinge upon it. Some of the heat is of course conducted or radiated to the members 8 and 9 and it is desirable to prevent them from overheating. However, it has been found that the splashing which occurs when streams of water are directed with some force on the casing immediately below the semi-cylindrical members, and an occasional direct impingement of the streams generally serves to prevent the members 8 and 9 from overheating.

In the use of this apparatus it is preferred that when attaching the block or cooling device B to the casing that the center of each of the portions 8 and 9 preferably be located over the points where the finish of one weld overlaps the beginning of the other weld and hence at the hottest point. The streams of water 48 and 49 preferably are directed onto the lower section L of the casing C just below the block of points vertically below the hottest points of the weld or seam S. Thus the weld first tends to reach a uniform temperature and then is cooled further to a point sufficiently below the critical temperature, which in the case of the medium carbon steel casing ordinarily employed is about 1000° F.

As has been stated the pipe or casing C contracts and the sections 8 and 9 gradually approach each other under the influence of the spring 22. When the weld or seam S has cooled sufficiently the block B is removed by gripping the handle G so that the lugs 30 move out of the notches 32. Thus, the spring clamp means 13 can be moved bodily away from the arms or projections 34 on the member 9 and the two halves of the block swung about the hinge H and the block removed from the casing C. Water may be then directed onto the weld for a few seconds until the temperature has been lowered to about 150° to 250° F. The metal will then have sufficient tensile strength to withstand the weight of the casing when the casing is lowered, being held entirely by the upper section U. The upper casing section U forms then the lower section of the next weld to be assembled and the process is repeated.

It will be evident that this method of cooling the weld gives the speed which is required in the field and furthermore it has been found that, notwithstanding the shortness of the time involved, internal stresses and excessive brittleness of the weld seam are eliminated. In fact, it has been found that the metallographic structure, freedom from brittleness, and the strength, are superior to those obtained when the weld is allowed to cool by radiation or conduction to normal atmosphere or both.

While the size of the apparatus may be varied within wide limits, it has been found that for a pipe having an outside diameter of 5½ inches, an apparatus consisting of two assembled copper members with an inside diameter of 5⅝ inches and a thickness of 1 inch tapering down to ⅛ inch 2 inches away from the weld on each side of the weld, grooved to fit about the weld, is satisfactory. For larger pipe, the inside diameter of assembled copper blocks is made ⅛ inch larger than the outside diameter of the pipe, the width and thickness remaining the same. The device is so proportioned that when the pipe has cooled to about 1000° F. the device will fit snugly around the pipe or casing. The skirt is preferably about 12 inches high. Using a block or device of this size, the weld is cooled to a temperature at which it is black in color in daylight in about one and one-half minutes, and the weld is then further chilled with water for a few seconds after the removal of the block.

Some of the advantages heretofore described, i. e. the improved metallographic structure, may be obtained even in a case where a weld has been cooled from welding temperature at a rate which fails to give the optimum metallographic structure. This is done by heating the weld to a temperature at least above the lower critical temperature and then cooling it at a rate, and by the methods, heretofore described. The advantages of improved metallographic structure are secured but of course no saving in time results.

The use of the device described and illustrated in the drawing for covering a newly-made weld is beneficial in that it aids in preventing oxidation of the weld, protecting it from undue access of air. When water is used as the cooling fluid in conjunction with such device, it flows down the outside of the lower casing section, assisting in cooling it.

While various detailed embodiments have been illustrated in the drawing and described in the accompanying specification, obvious modifications will be readily apparent to those skilled in the art.

I claim:

1. A method of cooling a newly welded metal joint between metal members which comprises directing one or more streams of cooling fluid against one of said members adjacent to, but not directly against, such joint, while said joint is temporarily covered to exclude such cooling fluid from direct contact therewith.

2. A method of cooling a newly welded metal joint between metal members which comprises directing a cooling liquid against one of said members adjacent to such joint, while said joint is temporarily covered by a heat-conducting protective device to exclude such liquid from direct contact with said joint, said cooling liquid being so directed that some of such liquid splashes against said protective device to cool the latter.

3. A method of cooling a newly welded joint in a member such as a metal pipe or casing which comprises surrounding said joint while hot with a protective device of heat conducting material and directing cooling fluid against said member closely adjacent to said protective device.

4. A method of quickly cooling a newly formed circumferential weld seam between metal pipe sections or the like which comprises maintaining the pipe sections in a vertical position, surrounding the hot seam with a protective device, and directing a cooling fluid against the pipe below the protective device.

5. A process of quickly cooling a hot weld seam in a pipe or the like which comprises covering the weld seam and closely adjacent area with an annular metal member spaced from but protecting said weld seam before the metal of the weld seam has cooled below the critical temperature and applying a fluid cooling medium to said pipe close to said metal member until said metal is cooled below its critical temperature.

6. A method as set forth in claim 5 which includes the additional steps of removing the metal member after the metal of said seam has cooled below its critical temperature and then directing the cooling fluid directly against said weld seam.

7. A process of cooling a hot horizontal weld seam in a vertical casing which comprises the steps of applying a protective heat conducting device to the hot points of the weld seam and adjacent areas of the casing before the metal of such weld has cooled below its critical range, directing a liquid cooling medium against uncovered areas of the casing immediately below said protective device and in alignment with said hot points until the metal of the weld seam is cooled below the critical range, removing said protective device from the casing, and directing a fluid cooling medium against the exposed weld seam.

JAMES R. CRAIG.

CERTIFICATE OF CORRECTION.

Patent No. 2,325,113.                                          July 27, 1943.

JAMES R. CRAIG.

It is hereby certified that error appears in the printed specification of the above numbered patent requiring correction as follows: Page 1, second column, line 53, for "meld" read --weld--; page 3, second column, line 63, claim 7, after "weld" insert --seam--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.